United States Patent [19]
Connolly

[11] 4,376,072
[45] Mar. 8, 1983

[54] METHOD OF PRODUCING MILK PROTEIN ISOLATES AND MILK PROTEIN/VEGETABLE PROTEIN ISOLATES AND COMPOSITIONS OF SAME

[75] Inventor: Philip B. Connolly, Sebastopol, Calif.

[73] Assignee: New Zealand Milk Products, Inc., Petaluma, Calif.

[21] Appl. No.: 207,281

[22] Filed: Nov. 17, 1980

[51] Int. Cl.$^3$ ................................................ A23J 1/20
[52] U.S. Cl. .............................. 260/120; 260/112 R; 426/583; 426/657
[58] Field of Search ........................... 260/112 R, 120; 426/583, 657

[56] References Cited

U.S. PATENT DOCUMENTS 3,687,928  8/1972  Brouwer et al. ..................... 260/122

OTHER PUBLICATIONS

New Zealand Journ. of Dairy Sci. & Tech., vol. 13, pp. 77–96 by C. R. Southward et al.
Cereal Chemistry, vol. 56, No. 2 (1979), pp. 95–100, L. C. Berardi et al.

*Primary Examiner*—Allan Lieberman
*Assistant Examiner*—P. Short
*Attorney, Agent, or Firm*—Naylor, Neal & Uilkema

[57] ABSTRACT

Proteins lacking isoelectric points are precipitated out of solution by combining with the solution a protein (i.e. one or more proteins) having an isoelectric point, alkalizing the mixture to a pH of about 9–11, acidifying the mixture to a pH of about 2–4, and adjusting the pH of the mixture to the isoelectric point of the protein to precipitate novel protein complexes.

A novel protein-free, undenatured dairy whey valuable for lactose crystallization and alcohol production is also obtainable.

3 Claims, No Drawings

METHOD OF PRODUCING MILK PROTEIN ISOLATES AND MILK PROTEIN/VEGETABLE PROTEIN ISOLATES AND COMPOSITIONS OF SAME

BACKGROUND OF THE INVENTION

Dairy whey is a byproduct of cheese or casein manufacture. In recent years, disposal of whey has become a major problem for the dairy industry. Past methods of whey disposal, such as introduction into waterways, municipal sewage systems, or land irrigation have proven to be undesirable and are falling under increasing government restriction. Approximately 12% of the solids in whey are proteins. The proteins in whey do not biodegrade easily and largely contribute to the difficulties of whey disposal. Whey proteins also complicate the use of whey in industrial application such as lactose crystallization or production of alcohol. Currently, attempts are being made to remove the protein from whey so that the remainder of the whey can be practically and usefully disposed of.

Unlike most proteins, whey proteins do not markedly demonstrate an isoelectric point, i.e., they do not precipitate out of solution at the environmental pH at which the sum of the electrostatic charges on the protein molecule is zero. Consequently, whey proteins cannot be easily and economically isolated from milk by a simple adjustment of their environmental pH as is done with other proteins. Currently, whey proteins are recovered from milk by heat coagulation or by use of ultrafiltration technology. Neither of the two recovery methods are without their negative points. Heat coagulation of whey proteins only isolates the lactalbumin in whey and yields a denatured, low functionality protein. The ultrafiltration process is quite involved and complex resulting in an expensive protein concentrate which contains significant amounts of the less desirable milk constituents, such as lactose. Ultrafiltered whey protein concentrates find only limited usage due to their expense and narrow range of functional properties. Whey proteins could find more widespread application if whey proteins could be isolated from milk in an undenatured, fully functional form at a practical and economical cost.

The protein isolation process contained in this invention promotes the interreaction of two different forms of protein, enabling the two proteins to be precipitated from suspension at a common, isoelectric pH. It is based upon the concept that if whey proteins, which are not subject to isoelectric pH precipitations, are interreacted with a protein or proteins which are strongly insoluble at isoelectric pH the resultant interreacted protein complex will precipitate out of suspension at the latter protein's isoelectric pH. The present invention uses this protein isolation process to completely react whey proteins with isoelectrically precipitable proteins to form unique protein complexes which can be separated from the whey leaving it essentially free of protein.

SUMMARY OF THE INVENTION

It is a general object of the present invention to provide a process for isoelectrically isolating whey proteins from non fat milk or dairy whey, resulting in physically and functionally unique interreacted protein complexes and substantially protein free whey.

Each protein complex prepared according to the present invention contains whey proteins in a form heretofore unavailable. The whey proteins are not only undenatured and fully functional but are also essentially free of the undesirable milk constituents such as lactose and ash. As a result, each protein complex possesses functional properties which are different from other currently manufactured proteins.

According to the present invention, non fat milk, in fluid form, is maintained at a temperature of from about 5° C. to 70° C. The non fat milk is then alkalized to a pH of from 9 to 10.5, the preferred pH being 10. The alkaline pH acts to solubilize the various protein fractions present in the milk. It is not necessary to hold the milk at the alkaline pH for any period of time, as the proteins are instantly soluble at pH 10, although a holding period of about 3 minutes is preferred. The alkaline non fat milk is then acidified to a pH of from 2 to 5. A pH of 3.5 is preferred. The proteins are interreacted at the acid pH. It is not necessary to hold the milk at the acid pH for any period of time, although a holding period of 5 minutes is preferred in order to insure complete interreaction of the proteins. The milk protein is then isolated from the milk by adjusting to a pH of from 4.2 to 5 resulting in the formation of curd and whey. Other isolation pH levels may be used in the above process, although protein yields are significantly lower when precipitation pH levels outside of the above stated range are used. A precipitation pH of 4.7 is preferred in the present invention. The curd can be separated from the whey in a number of ways, either by passing the suspension through a screen or filter paper, use of a centrifuge, superdecanter, or clarifier, and/or use of conventional casein, lactalbumin, or vegetable protein production equipment.

The separated curd is thoroughly washed with clean water to remove any occluded milk solids and is separated from the wash water in the same fashion as is outlined above for the separation of the curd from the whey. The washed curd can then be preserved by drying and/or can be resuspended in fresh water and solubilized by reaction with an alkaline agent.

The whey remaining after separation of the curd therefrom as described above is substantially free of protein and can either be disposed of, dried, or utilized in industrial applications. Normally, whey resulting from manufacture of casein from non fat milk contains approximately 1% protein (w/w) on the basis of the weight of the liquid whey. The whey resulting from the manufacturing process of the present invention is significantly different from normal dairy whey.

The protein curd resulting from the present invention is actually an interreacted complex of all of the various protein fractions of milk. The resolubilized curd demonstrates markedly different functional properties than those properties exhibited by individual or blended milk protein fractions. The interreacted protein complex is also markedly different from conventional milk protein co-precipitate products in that the whey protein fraction of the protein complex is undenatured and fully functional while the whey protein fraction of conventional milk co-precipitate products has been denatured by heat treatment and lacks functionality.

The proportion of casein and whey proteins in the interreacted protein complex can be further adjusted by adding dairy whey, from casein or cheese manufacture, to non fat milk before subjecting the milk to the process of the present invention. An increase in the proportion of whey proteins in the interreacted protein complex not only serves as an inexpensive method of removing whey proteins from dairy whey but also further modifies the physical and functional properties of the protein complex. As an example, isoelectric casein curd is relatively coarse and precipitates easily from the acid whey. The interreacted casein/whey protein curd of the present invention is finer, due to the presence of the whey proteins in the curd. As the proportion of whey proteins in the interreacted protein curd is increased in relation to the proportion of casein, the curd tends to become so fine that it will not settle out of the acid whey. The incorporation of increasing amounts of whey proteins into the interreacted protein curd modifies the physical appearance of the curd to an appearance more like that of whey proteins and less like that of casein.

Yields of protein from the process of the present invention are controlled by selection of a combination of process pH levels and reaction temperature. Protein yields increase as the alkaline process pH levels are increased from 9 to 9.6. Yields of protein show no increase as the alkaline pH level is increased about 9.6. Protein yields are also increased as the acid reaction pH level is decreased from 5 down to 4. Yields of protein show no increase as the acid reaction pH level is decreased below 4.0. The optimum precipitation pH level for the protein complex is 4.7, the isoelectric pH of casein.

Careful control of the acid reaction process pH will also result in the isolation of Vitamin $B_2$, Riboflavin, in the interreacted protein complex. Normally dairy whey is a brilliant amber color. The color of the whey is due, in large part, to riboflavin, a native vitamin in milk. Normal dairy manufacturing procedures have proven ineffective in isolating the riboflavin from the other milk constituents. The riboflavin always remains in the whey. By utilizing acid reaction pH levels between 3.5 and 5, in the process of the present invention, the resultant interreacted protein curd will contain the riboflavin which normally would remain in the whey. The curd takes on the characteristic amber color of riboflavin while the resultant whey is pale or clear in coloration.

As the reaction temperature was increased from 5° C. to 55° C., yields of protein from the above process correspondingly increased. At 5° C., the protein yield was only slightly higher than the normal yield of casein from non fat milk. At a reaction temperature of 55° C., in combination with proper pH levels, all of the whey proteins were precipitated from the milk resulting in a significantly higher protein yield than that obtained from casein manufacture. Results of the temperature investigation show that the interreaction of proteins as contained in the present invention is temperature dependent, i.e., the rate and extent of interaction between the dissimilar proteins corresponds directly with the reaction temperature.

An interreacted protein complex of casein, vegetable protein, and whey proteins can be produced by subjecting a mixture of non fat milk and protein containing vegetable products to the process of the present invention. For this investigation, a commercially available soy protein, Supro 710, manufactured by Ralston Purina Co., was dispersed in non fat milk. The resultant protein complex possessed functional properties superior to those of soy isolate and more similar to the functional properties exhibited by casein. Other sources of vegetable protein, such as wheat gluten or cottonseed, may be used.

An interreacted protein complex of vegetable protein and whey proteins can be produced by subjecting a mixture of protein containing vegetable products and dairy whey to the process of the present invention. Functional properties of the resultant protein can be controlled by regulation of the ratio of vegetable protein to whey proteins in the original admixture. Ultrafiltered whey protein concentrates were dispersed in water with soy isolate or vital wheat gluten. Equivalent results would be obtained with unconcentrated dairy whey and any protein containing oilseed flour. The effects of protein balance and yield would be the same.

The above vegetable protein/milk protein interreacted complexes are different from current commercially available blends of vegetable proteins and milk proteins in that, in the present invention, the vegetable proteins are first interreacted and then isoelectrically precipitated in conjunction with the milk proteins. In presently available blends, the milk protein and vegetable protein have been blended together after they are separately isolated. The interreacted vegetable protein/milk protein curds differ physically from either vegetable isolate curds or milk protein curds. Soy protein, which normally exhibits an extremely fine isoelectric curd, will cause a decrease in coarseness of the milk protein curd as it is increased in relative concentration. As the concentration of soy protein in the interreacted protein complex increases, the resultant curd assumes more of the appearance of a soy isolate curd. The same effect is noticed when wheat gluten is used in place of soy protein. The size and handling characteristics of the interreacted protein curds of the present invention are totally determined by the ratio of proteins present in the complex and the isolate curd characteristics of these individual proteins.

After washing, the curd resulting from the process of the present invention contains at least 90% protein on a moisture free basis. Generally, the resultant curd contains 95% protein, with the remainder of the curd consisting mainly of ash and minor amounts of carbohydrates and milkfat or vegetable oil. Resolubilization of the curd is accomplished by resuspending the curd in sufficient water and adding alkaline agents to the protein suspension. The quantity of alkaline agents necessary to solubilize the interreacted protein curd is about equivalent to the amount of alkaline agent utilized when solubilizing an equal amount of casein.

DETAILED DESCRIPTION

Example 1

As an example of the process of the present invention and to show how process conditions can affect the yield of the interreacted casein/whey proteins complex from non fat milk, 1000 grams of pasteurized fluid skim milk was maintained at a temperature of 55° C. The milk was alkalized, using 2 N sodium hydroxide, to pH 10 and held at that pH for 3 minutes. The milk was then acidified to pH 2.5 using 2 N sulfuric acid and held at that pH for 7 minutes. The protein curd was precipitated by adjusting the milk to pH 4.7 using 2 N sodium hydroxide, resulting in the formation of curd and whey. The curd was separated from the whey using suction filtration and washed three times in deionized water. The curd was separated from the wash water each time by using suction filtration. As a control, a second sample of skim milk was treated using the conventional method for production of casein consisting of simply reducing the pH to 4.7 with 2 N sulfuric acid and separating and washing the resultant curd. The resulting curds and wheys were analyzed for nitrogen content using the Kjeldahl method and the yield of protein from the skim milk was then calculated.

|  | Process of the Present Invention | Conventional Casein Process |
|---|---|---|
| Percent of Protein Recovered Based on Total Protein Available | 99.1% | 85.3% |
| Nitrogen Content of Whey | .05% | .12% |

Analysis of the nitrogen in the wheys by the method of Harland and Ashworth (1947) showed the two wheys to contain the following types of nitrogen:

TABLE 1

|  | Process of the Present Invention | Conventional Casein Process |
|---|---|---|
| As fine casein curds | .030% | .066% |
| As non-protein nitrogen | .020% | .020% |
| As Whey Proteins | 0 | 0.038% |
| Total Whey Nitrogen Content | 0.05% | 0.12% |

Although the whey produced by the process of the above example contains 0.05% nitrogen, none of the nitrogen is from whey proteins. All of the whey proteins have been precipitated from the milk. Further evidence that the whey contained no whey proteins is that when the whey was heated to 100° C., it remained perfectly clear with no evidence of clouding. Normally, dairy whey will turn extremely white and opaque at temperatures above 85° C. due to heat denaturation of the whey proteins. The clarity of the above heated whey indicated that all of the heat coagulable proteins in the milk had been precipitated in the protein curd. The presence of fine casein curds in the whey is thought to be due to the use of inadequate curd recovery procedures or use of improper manufacturing equipment. It is to be expected that the casein fines can be removed from the whey by use of improved procedures and/or manufacturing equipment.

When the process of the above example is run at other reaction temperatures, however, the amount of protein yielded is different. Reaction temperatures of 5°, 30°, 38°, 50°, 55°, 60°, and 70° C. were investigated. At reaction temperatures below 55° C., some, but not all, of the whey proteins were precipitated from the milk. The following table shows a comparison of protein yields from skim milk when the above process is used at the various reaction temperatures studied:

TABLE 2

| Process/Reaction Temperature | Percent of Protein Recovered Based on Total Protein Available |
|---|---|
| Control Casein | 83.9 |
| 5° C. | 89.3 |
| 30° C. | 92.6 |
| 38° C. | 97.5 |
| 50° C. | 97.5 |
| 55° C. | 99.1 |
| 60° C. | 99.1 |
| 70° C. | 99.1 |

The yield of protein from skim milk increases as the reaction temperature used in the process of the present invention increases up to 55° C. At a reaction temperature above 55° C. there is no significant difference in protein yield. The wheys which resulted from the above investigation were heated to 100° C. Only those wheys produced from process reaction temperatures of 55° C. or higher remained clear on heating, indicating that all of the whey proteins are isolated from milk only when the reaction temperature used is 55° C. or higher. Those wheys which resulted from process reaction temperatures below 55° C. contained increasing amounts of proteins. Even at the extremely low temperature of 5° C., the yield of protein from milk was better than the best yield obtained from the control casein manufacture process, indicating that some fraction of the milk whey proteins was precipitated in the protein curd at all reaction temperatures investigated.

As earlier indicated, a range of pH levels can be used in both the alkaline and acid reaction steps of the process, as well as the protein precipitation step of the process. In the alkaline step of the process of the present invention, pH levels of 9, 9.4, 9.6, 10 and 10.5 were employed. In the acid step of the process, pH levels of 4.7, 4, 3.9, 3.5, 2.5 and 2 were employed. The following table shows a comparison of protein yields from skim milk at a variety of pH levels used:

TABLE 3

| | Process/pH Levels | | | | |
|---|---|---|---|---|---|
| | Milk pH | Alkaline pH | Acid pH | Precipitation pH | Visible Clouding of Whey At 100° C. | Percent of Protein Recovered Based On Total Protein Available |
| 1. | 6.5 | → | → | 4.7 | Extreme | 86.0 |
| | Fresh curd casein | | | | | |
| 2. | 6.5→ | → | 2.5→ | 4.7 | Extreme | 86.0 |
| 3. | 6.5→ | 10→ | → | 4.7 | Slight | 99.1 |
| 4. | 6.5→ | 10→ | 4.2→ | 4.7 | Moderate | 95.9 |
| 5. | 6.5→ | 10→ | 4.0→ | 4.7 | None | 99.1 |
| 6. | 6.5→ | 10→ | 3.5→ | 4.7 | None | 99.1 |
| 7. | 6.5→ | 10→ | 2.5→ | 4.7 | None | 99.1 |
| 8. | 6.5→ | 10→ | 2.0→ | 4.7 | None | 99.1 |
| 9. | 6.5→ | 10.5→ | 3.9→ | 4.7 | None | 98.9 |
| 10. | 6.5→ | 9→ | 2.5→ | 4.7 | Moderate | 89.2 |
| 11. | 6.5→ | 9.4→ | 2.5→ | 4.7 | Slight | 92.6 |
| 12. | 6.5→ | 9.6→ | 2.5→ | 4.7 | None | 98.9 |

The alkaline step may be carried out at a pH level of 9–11; the acid step may be carried out at a pH level of 2–5. The preferred levels are 9.6–10.5 and 2–4.

Some proteins remained in the milk when alkaline pH levels below 9.6 were utilized. At pH levels above 9.6, in combination with proper acid pH levels, there was no significant difference in protein yields from the milk. Proteins also remained in the milk when acid reaction pH levels above 4 were used in the process. Although the yield of protein from alkalizing to pH 10 and then precipitating the protein at pH 4.7 (line 3 in Table 3) is high, the whey resulting from the process clouded visibly when heated to 100° C., indicating the presence of some whey proteins in the whey. The high yield in line 3 is due to a low fine curd casein content in the whey. When alkaline pH levels of 9.6 or higher, in combination with acid reaction pH levels of 4 or lower, were used in the process of the present invention, the wheys did not cloud visibly when heated to 100° C., indicating that no whey proteins were present in the wheys. All of the other ways produced in the above investigation clouded to some extent when heated to 100° C. Both the alkaline solubilization step and the acid reaction step of the process of the present invention are necessary to precipitate all of the proteins from the milk.

As an example of the functional properties possessed by the interreacted casein/whey protein complex of the present invention, a protein curd produced from pasteurized skim milk by the process of the present invention was resolubilized by suspending the curd in sufficient water to form a 15% solids (w/w) dispersion. The curd was solubilized by adding sufficient sodium hydroxide to the dispersion to raise the pH to 6.7 and heating the dispersion to 60° C. The soluble protein dispersion was evaluated for whipping capacity, foam stability, emulsification capacity, and heat gelling characteristics. Whipping capacity was measured by diluting a sufficient amount of the 15% protein dispersion with water to form 150 grams of a 5% protein (w/w) dispersion. The dispersion was whipped at high speed for 3 minutes in a Hobart Kitchenaid mixer. Whipping overrun was determined on the basis of densities of the whipped and unwhipped dispersion. Foam stability was evaluated by measuring the amount of weeping from the whipped dispersion per unit of time. Emulsification capacity of the solubilized curd was determined by measuring the volume of vegetable oil which was emulsified by 1 gram of protein, dispersed in 99 grams of water, at the point of emulsion breakdown. The heat gelling characteristics of the protein curd were determined by heating a 12% protein (w/w) dispersion of the solubilized curd or 12% solids dispersions consisting of 6 parts interreacted casein/whey protein curd and 4 parts 70–75% protein ultrafiltered whey protein concentrate to 80° C. in a water bath over a period of 30 minutes. The heated dispersions were evaluated for gel strength using an Iio curd meter and observed for texture and appearance. The following table lists the results of functional property evaluations on the solubilized curd of Example 1. For comparison purposes, results of functional property evaluations for commercial sodium caseinate and a similarly resolubilized fresh curd casein isolated from a similar sample of non fat milk are also listed.

TABLE 4

| Functional Properties | Interreacted Casein/Whey Protein Complex | Sodium Caseinate | Resolubilized Fresh Curd Casein |
|---|---|---|---|
| Whipping Overrun | 752% | 700% | 760% |
| Foam Stability: | | | |
| Initial Breakdown | 13 minutes | 12 minutes | 13 minutes |
| 3 ml. Weeping | 16 minutes | 20 minutes | 20 minutes |
| 5 ml. Weeping | 19.5 minutes | 25 minutes | 26 minutes |
| 10 ml. Weeping | 26.5 minutes | 42 minutes | 48 minutes |
| Emulsification Capacity (ml. Vegetable Oil/1 gram Protein) | 335 | 232 | 235 |
| Heat Gelling at 85° C. (g/cm$^2$) | Liquid; no gel | Liquid; no gel | Liquid; no gel |
| Heat Gel at 85° C. in 6:4 Combination with WPC (g/cm$^2$) | Moderate Gel 70 g/cm$^2$ | Liquid; no gel | Liquid; no gel |

The protein of the present invention possesses markedly different functional properties than do casein or caseinates. Widely varying functional properties in the protein complex can also be obtained by varying the degree of heat treatment which the starting milk receives.

Three sources of non fat milk were utilized during the course of this investigation, dried non fat milk, pasteurized fluid non fat milk, and raw non fat milk. Under identical process conditions, the three sources of non fat milk produced interreacted casein/whey protein curds with varying functional properties. It is believed that the variation in protein functional properties noted from the three sources of non fat milk is due to the effect of heat on the milk whey proteins, either by direct denaturation of the whey proteins or other heat induced modifications of the whey proteins which directly affect the functional properties.

I have observed that the process of the present invention appears to be only able to promote the interreaction of proteins which have not been heat denatured or modified. Heat affected proteins do not appear to react in this process and, thus, are not precipitated and included in the interreacted protein complex. The curd resulting from the processing of non fat dried milk, for example, would probably not contain as much whey protein as the curd resulting from the processing of raw milk due to the differing amounts of heat treatments used in the production of the two non fat milk sources. It is believed that the differences in functional properties evidenced by the interreacted protein curds produced from the three non fat milk sources is due to the varying amounts of whey proteins contained in each interreacted protein complex.

The following table lists the results of functional property evaluations of protein curds obtained from each of the above three non fat milk sources. All curds were resolubilized to pH 6.7 using sodium hydroxide after having been processed identically. The functional property measurements listed in Table 4 for sodium caseinate and resolubilized fresh curd casein can be referred to for further comparison.

TABLE 5

| Functional Properties | Pasteurized Dried Non Fat Milk | Pasteurized Non Fat Milk | Raw Non Fat Milk |
|---|---|---|---|
| Whipping Overrun (%) | 1700% | 830% | 334% |
| Foam Stability: | | | |
| Initial Breakdown | 33 minutes | 12 minutes | 1 minute |
| 3 ml. Weeping | 47 minutes | 16 minutes | 1.5 minutes |
| 5 ml. Weeping | 74 minutes | 22 minutes | 2 minutes |
| 10 ml. Weeping | — | 37 minutes | 3.5 minutes |
| Emulsification Capacity (ml. Vegetable Oil/1 gram Protein) | 280 | 316 | 336 |
| Heat Gel at 85° C. | No Gel | Remained | Liquid |
| Heat Gel in 6:4 Combination with WPC | All formed moderate strength gel | | |

It is obvious that the amount of whey protein present in the interreacted protein curd has a direct effect on the functional properties of the interreacted protein.

Example 2

An interreacted protein in which the proportion of whey proteins was increased as compared to Example 1, was produced by mixing together 1000 grams of single strength Camembert cheese whey with 500 grams of raw skim milk and maintaining the mixture at 60° C. The mixture was then subjected to the process described in Example 1. The yield of the resultant protein was determined, as well as the protein content of the resultant whey. The curd produced in this example was extremely fine and very difficult to recover from the whey. It is believed that the low recovery of protein is due to this factor. Functional properties of the resolubilized curd were determined in the manner previously outlined. The results of evaluation of the process of this example are listed in the following table and it can be seen that the product was capable of forming a gel when a 12% solids dispersion is heated to 85° C. It is calculated that the final ratio of casein to whey proteins in the interreacted curd was approximately 6:4.

TABLE 6

| | |
|---|---|
| Percent of Protein Recovered Based on Total Protein in Mixture | 77.2% |
| Total Nitrogen Remaining in Whey | .074% |
| Nitrogen as Fine Casein Curds | .039% |
| Non-Protein Nitrogen | .030% |
| Whey Protein Nitrogen | .005% |
| Emulsification Capacity of Resolubilized Curd (ml. Vegetable Oil/1 Gram Protein) | 398 |
| Heat Gel at 85° C. | Weak to Moderate Strength Gel |

Example 3

An interreacted complex of casein, soy protein, and whey proteins was produced by dispersing 14 grams of a commercially available soybean protein isolate, Supro 710, which is manufactured by Ralston Purina Co., into 750 grams of pasteurized fluid skim milk and maintaining the mixture at 60° C. The mixture was then subjected to the process described in Example 1. The yield of resultant protein and protein content of the resultant whey were then determined. The emulsification capacity of the resolubilized curd was measured by the procedure previously described. The results of the evaluation of the process of this example are listed in the following table. It is calculated that the ratio of milk protein to soy protein in the mixture was 65:35.

TABLE 7

| | |
|---|---|
| Percent of Protein Recovered Based on Total Protein in Mixture | 95.0% |
| Emulsification Capacity of Resolubilized Curd (ml. Vegetable Oil/1 gram Protein) | 290 |
| Emulsification Capacity of Resolubilized Casein (ml. Vegetable Oil/1 gram Protein) | 235 |
| Emulsification Capacity of Supro 710 (ml. Vegetable Oil/1 gram Protein) | 256 |

Example 4

An interreacted complex of soy protein and whey proteins was produced by dispersing 28.5 grams of a cryogenically precipitated soy isolate and 46 grams of a 55% protein ultrafiltered dairy whey protein concentrate in sufficient water to form an admixture containing approximately 10% (w/w) protein. The mixture was maintained at 21° C., room temperature and alkalized to pH 10 using sodium hydroxide. The mixture was then acidified to pH 2.5 using hydrocloric acid and held at that pH for 5 minutes. The protein was precipitated by adjusting the mixture to pH 4.9, resulting in the formation of curd and whey. The resultant curd was extremely fine and was separated from the whey by centrifugation. The curd was analyzed for protein content and yield of protein from the mixture was then calculated.

An interreacted protein complex of dairy whey protein and wheat gluten, at a ratio of about 1:1, was also produced by following a process which is similar to the process described above. The following table lists the yields obtained for both whey protein and vegetable protein complexes isolated by the above processes.

TABLE 8

| | Soy | Wheat Gluten |
|---|---|---|
| Percent of Nitrogen Recovered from Total Nitrogen in Mixture | 86.2% | 74.2% |

The yields of protein show conclusively that dairy whey proteins can be precipitated from solution after reaction with another protein which does precipitate at isoelectric pH.

As proof that the process of the present invention does not merely modify the functional properties of individual proteins acid casein was suspended in sufficient water to form a 4% (w/w) protein dispersion. The dispersion was maintained at 55° C. and subjected to the process conditions as described in Example 1. The resultant casein curd was resolubilized and evaluated by the processes described previously. The following table lists the results of the functional property evaluations of the above casein curd and compares the curd's functional properties to the functional property measurements obtained in previous evaluations for sodium caseinate and a resolubilized fresh curd casein sample. It is obvious from the table that the process of the present invention did nothing to modify the functional properties of the casein.

TABLE 9

| Functional Properties | Casein Curd Treated As In Example 1 | Sodium Caseinate | Resolubilized Conventional Casein |
|---|---|---|---|
| Whipping Overrun (%) | 725% | 700% | 760% |
| Foam Stability: | | | |
| Initial Breakdown | 16 minutes | 12 minutes | 13 minutes |
| 3 ml. Weeping | 22 minutes | 20 minutes | 20 minutes |
| 5 ml. Weeping | 28 minutes | 25 minutes | 26 minutes |
| 10 ml. Weeping | 47 minutes | 42 minutes | 48 minutes |
| Emulsification Capacity (ml. Vegetable Oil/1 gram Protein) | 225 | 232 | 235 |
| Heat Gel at 85° C. | NO GEL REMAINED LIQUID | | |
| Heat Gel at 85° C. in 6:4 Combination with WPC | NO GEL REMAINED LIQUID | | |

A sample of swiss cheese whey was also subjected to the process outlined in Example 1. No protein was precipitated from this investigation. I therefore concluded that whey proteins cannot be isoelectrically isolated by themselves using the process of the present invention. It is necessary to first react the whey proteins with another protein which is strongly insoluble at isoelectric pH before the whey proteins can be precipitated.

An attempt was made to treat casein and whey proteins separately by the process of the present invention, isolate them separately, and determine whether or not a simple mixture would have properties comparable to the protein complex described in the present invention.

As indicated by Table 9, the functional properties of casein were not affected by the procedure. It was not possible to isolate the whey proteins in undenatured form to produce a product comparable to the whey proteins in the protein complex of the present invention. It is not possible, in fact, to produce undenatured whey protein isolates by any method currently known. Whey proteins are produced either in a heat denatured, isolate form or in an undenatured form which is contaminated with excessive amounts of lactose and other undesirable milk constituents. The heat denatured form of lactalbumin lacks functional properties and is used mainly as a nutritive additive to processed foods or in baking. The presence of lactose and other milk constituents in the undenatured whey protein concentrates causes changes in the behavior of the whey proteins. Thus, it is not possible to compare the interreacted protein complex of the present invention to simple blends of whey proteins because it is not possible to produce an isoelectrically precipitated, undenatured whey protein isolate.

Table 4 lists the measurements of functional properties of commercial sodium caseinate and sodium caseinate made by resolubilizing fresh curd casein. When each of these caseinates was combined with a whey protein concentrate containing 75% protein on a 6:4 (w/w) basis, caseinate to whey protein concentrade, respectively, the resultant mixture did not gel upon heating. However, in Example 2, an interreacted complex of casein and whey proteins in an approximate ratio of 6:4 (w/w), casein to whey protein, respectively, did gel upon heating under identical conditions. Both of these mixtures contained like ratios of casein and whey protein, yet the simple blend of the two protein fractions would not gel while the interreacted protein complex of the present invention did gel.

The following table is a further illustration of the comparison of an interreacted casein and whey protein complex to a blend of casein and lactalbumin. The protein complex of Example 2 is compared to a 6:4 (w/w) blend of sodium caseinate and heat denatured lactalbumin, respectively, for emulsification capacity. For comparison purposes, the emulsification capacity of sodium caseinate is also included in the table.

TABLE 10

| Protein Type | Emulsification Capacity (ml. Vegetable Oil/1 gram Protein) |
| --- | --- |
| Interreacted Casein/Whey Protein Complex | 398 |
| Sodium Caseinate | 230 |
| Simple blend of caseinate and lactalbumin | 164 |

As can be seen from this table, the simple blend of casein and heat denatured lactalbumin does not compare to an interreacted complex of casein and whey proteins produced by the process of the present invention.

The protein complex of the present invention is isolated in the form of an isoelectric protein curd which is very similar to other food grade protein curds, such as casein. The potential for end use applications of such a protein is believed to be limitless, much as the potential for end use applications of casein is limitless. Functional properties of the protein complex can be enhanced or modified by utilizing basic technology already developed in the manufacture of caseinates from casein. The interreacted protein complex of the present invention can be utilized in the same manner as casein is utilized in the food industry today with greatly enhanced functional properties such as ability to whip and form stable emulsions. In the same manner, metallic salts of the protein complex can be utilized in widely varying applications or for specific functional properties just as metallic casein salts are utilized for their specific functional properties and in widely varying applications today.

For example, a sodium salt of the interreacted protein complex whips to over twice the overrun of sodium caseinate and forms a resultant foam which is over twice as stable (Table 5). The protein complex of the present invention can also be used by itself, or as an extruder of ultrafiltered whey protein concentrates, in applications where heat gellation, in combination with a low level of lactose, is desired, such as in egg white replacers. Because of its high emulsification capacity, the interreacted protein complex of the present invention may find some use in coffee whiteners, whipped toppings, or in other applications where the protein in the food system provides the primary function of stabilizing the system.

What is claimed is:

1. A protein composition obtained from the method comprising treating at about 55° C. a system of dairy whey and a normally acid insoluble protein having an isoelectric point of 4–5 by alkalizing the system to a pH of 9–11, acidifying the system to a pH of 2–4, adjusting the pH of the system to the isoelectric point of said protein, and separating and recovering the precipitated protein complex resulting therefrom.

2. A substantially protein-free, undenatured dairy whey obtained by the method comprising treating at about 55° C. a system of dairy whey and a normally acid insoluble protein having an isoelectric point of 4–5 by alkalizing the system to a pH of 9–11, acidifying the system to a pH of 2–4, adjusting the pH of the system to the isoelectric point of said protein, separating the precipitate resulting therefrom, and recovering the resultant filtrate.

3. The method for precipitating whey protein comprising treating non-fat milk by maintaining it at a temperature of about 55° C., alkalizing it to a pH of about 9–11, acidifying it to a pH of about 2–4, and adjusting its pH to the isoelectric point of casein.

* * * * *

UNITED STATES PATENT AND TRADEMARK OFFICE
CERTIFICATE OF CORRECTION

PATENT NO. : 4,376,072
DATED : March 8, 1983
INVENTOR(S) : Philip B. Connolly

It is certified that error appears in the above—identified patent and that said Letters Patent is hereby corrected as shown below:

At column 12, line 19, the word "extruder" should read "extender".

Signed and Sealed this

Eleventh Day of September 1984

[SEAL]

Attest:

GERALD J. MOSSINGHOFF

Attesting Officer    Commissioner of Patents and Trademarks